United States Patent [19]
Brichet et al.

[11] Patent Number: 5,224,820
[45] Date of Patent: Jul. 6, 1993

[54] OPERATING MECHANISM FOR VARIABLY SETTABLE BLADES OF A TURBOMACHINE

[75] Inventors: Christophe Brichet, La Crois en Brie; Jean-Louis Charbonnel, Le Mee Sur Seine; Gérard G. Miraucourt, Brie Comte Robert; Jacky Naudet, Bondoufle; Jean-Francois Van De Voorde, Moisenay, all of France

[73] Assignee: Societe Nationale d'Etude et de Construction de Moteurs d'Aviation, Paris, France

[21] Appl. No.: 950,138

[22] Filed: Sep. 24, 1992

[30] Foreign Application Priority Data

Sep. 25, 1991 [FR] France ............... 91 11794

[51] Int. Cl.⁵ .................................. F01D 17/00
[52] U.S. Cl. ......................... 415/150; 415/159; 415/162
[58] Field of Search ............ 415/150, 148, 155, 159, 415/160, 162

[56] References Cited

U.S. PATENT DOCUMENTS

| | | | |
|---|---|---|---|
| 2,613,029 | 10/1952 | Wilde | 415/162 |
| 3,251,539 | 5/1966 | Wolfe et al. | 415/150 |
| 3,310,284 | 3/1967 | Inaba et al. | 415/150 |
| 3,360,624 | 1/1968 | Endress | 415/150 |
| 3,635,580 | 1/1972 | Richardson | 415/148 |
| 4,634,340 | 1/1987 | Stetter | 415/150 |
| 4,847,287 | 10/1989 | Grieb | 415/162 |

FOREIGN PATENT DOCUMENTS

| | | |
|---|---|---|
| 954637 | 11/1956 | Fed. Rep. of Germany . |
| 1230393 | 9/1960 | France . |
| 2193429 | 2/1974 | France . |
| 364581 | 9/1962 | Switzerland . |
| 409226 | 3/1966 | Switzerland . |
| 606560 | 8/1948 | United Kingdom . |

*Primary Examiner*—John T. Kwon
*Attorney, Agent, or Firm*—Oblon, Spivak, McClelland, Maier & Neustadt

[57] ABSTRACT

In a turbomachine in which the stator includes at least one stage of pivotable blades and a ring which is movable axially to operate the levers which rotate the blades, the ring is moved by varying the pressure of gas which is contained in sealed chambers and which exerts a force between the movable ring and another fixed ring. This arrangement enables a better distribution of the forces to be achieved than purely mechanical movement control systems.

9 Claims, 5 Drawing Sheets

OPERATING MECHANISM FOR VARIABLY SETTABLE BLADES OF A TURBOMACHINE

BACKGROUND OF THE INVENTION

1. Field of the invention

The present invention relates to turbomachines in which the stator carries at least one circumferential stage of blades which are pivotable in order to vary their setting.

2. Summary of the prior art

Compressors and turbines are known in which the stages of fixed blades connected to the stator are capable of being pivoted about a radial axis in order to modify the flow characteristics of the compressed gases and thereby improve the output of the machine under certain rotor operating conditions by preventing surging. If the stator is regarded as a first annular structure, a second annular structure is provided which is movable axially on the first while being held concentric therewith by suitable guiding means, the second annular structure being pivotally connected to the free ends of levers carried by the blades so that axial movement of the second annular structure rocks the levers to pivot the blades. The connection between the second annular structure and the levers may simply comprise radial handles carried by the levers at their free ends, and grooves or channels in the second annular structure which receive the handles. Such an arrangement is described in French Pat. No. 1 230 393.

All constructions known by the inventors utilize mechanical transmission means to control the axial movement between the two annular structures, such as pivoted levers, connecting rods, pinions or screw and nut systems, which have certain drawbacks. In the first place they are cumbersome and heavy. Furthermore, they are not always reliable because of the risk of seizure resulting from friction and wear of the assembled parts, especially in machines which operate at high temperatures, as lubrication is difficult and, also, substantial thermal expansion is prejudicial to a satisfactory degree of precision in the adjustment of the parts. Finally, it is difficult to apply an even force around the entire circumference of the second annular structure, which increases the risk of jamming of the movable annular structure.

SUMMARY OF THE INVENTION

With the aim of avoiding these drawbacks, according to the invention, in a turbomachine comprising a first annular structure disposed about a longitudinal axis, at least one circumferential stage of pivotable blades carried by said first annular structure, each blade of said at least one stage being mounted to pivot about a radial axis, a plurality of operating levers connected to said blades, a second annular structure disposed about said longitudinal axis and engaging said operating levers whereby relative displacement of said first and second annular structures in the direction of said longitudinal axis causes said operating levers to pivot said blades, and means for maintaining said first and second annular structures disposed concentrically with respect to each other, there is provided at least one circumferentially directed flange on one of said first and second annular structures defining a circumferentially directed groove in said one annular structure, a circumferentially directed rib on the other of said first and second annular structures disposed in said groove and dividing said groove into two portions of variable volume, means cooperating with said rib and said at least one flange to define a sealed chamber in at least one of said two portions of said groove, and control means for adjusting the quantity of gas in said sealed chamber or chambers to cause controlled relative displacement of said first and second annular structures in the direction of said longitudinal axis.

The arrangement is preferably symmetrical with two flanges and two chambers, each chamber being controlled by an independent control device.

The simplest arrangement, which ensures in principle a force evenly distributed around the second annular structure, comprises chambers which extend around the entire circumference of the machine. However, the invention also envisages arrangements in which chambers extend around only part of the circumference of the second annular structure or are divided up over several parts of the circumference.

The means which cooperates with the rib and the at least one flange to define the sealed chamber or chambers may take a variety of forms. They may be, for example, seals mounted on the flanges and on the rib and rubbing against the opposite annular structure, or bellows extending between the flanges and the rib, or pistons sealingly slidable in the flanges and pressing against the rib, the chambers being formed in the flanges.

A number of embodiments of the invention will now be described, by way of non-limiting example, with reference to the attached drawings.

DESCRIPTION OF THE PREFERRED EMBODIMENTS

Figure 1:
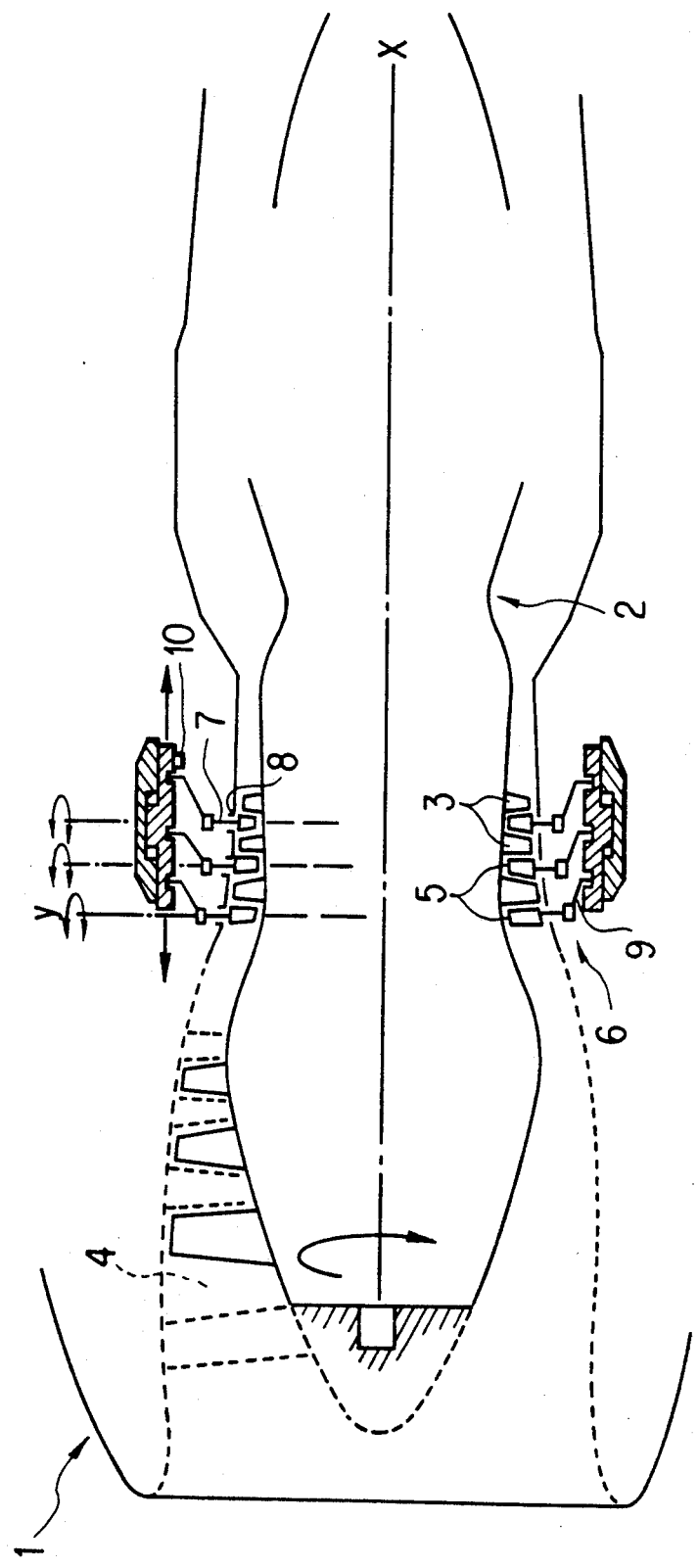
FIG. 1 is a diagrammatic overall axial sectional view of a turbomachine showing the part to which the invention is applied.

With reference to FIG. 1, the turbomachine comprises a stator 1 and a rotor 2 which is concentrically surrounded by the stator. The rotor 2 carries blades 3 which are rigidly connected to it and therefore rotate with it around its longitudinal rotational axis X. The rotor blades 3 are responsible for the compression of the gases which flow into an annular flow path 4 which is defined between the rotor 2 and the stator 1, and are arranged obliquely so as to push the gases back towards the outlet end of the annular flow path 4, i.e. to the right in FIG. 1. The stator 1, on the other hand, carries pivotable blades 5 which also extend into the annular flow path 4. All the blades 3 and 5 are arranged in stages in which they are evenly-distributed around the circumference of the machine, the stages of rotor blades 3 alternating with the stages of pivotable stator blades 5 in the longitudinal direction.

The pivotable blades 5 are provided for straightening the flow of the gases and they extend, in principle, substantially longitudinally, but slight adjustments of their orientation or pitch lead to a better efficiency of the machine in certain operating regimes of the rotor 2, and particularly at low speeds. It is for this reason that the end 6 of each blade 5 mounted in the stator 1 comprises, in this type of design, a journal 7 which is rotatable about a radial axis Y in a bearing 8 of the stator 1, and a lever 9 which is oriented obliquely with respect to both the radial and circumferential directions and which is connected at one end to a portion of the journal 7 projecting from the bearing 8 outside the annular flow path 4 and is provided with a radial handle 10 at its free opposite end. With this arrangement, a force exerted on the handles 10 in a longitudinal direction will cause the pivotable blades 5 to rotate.

Figure 2:
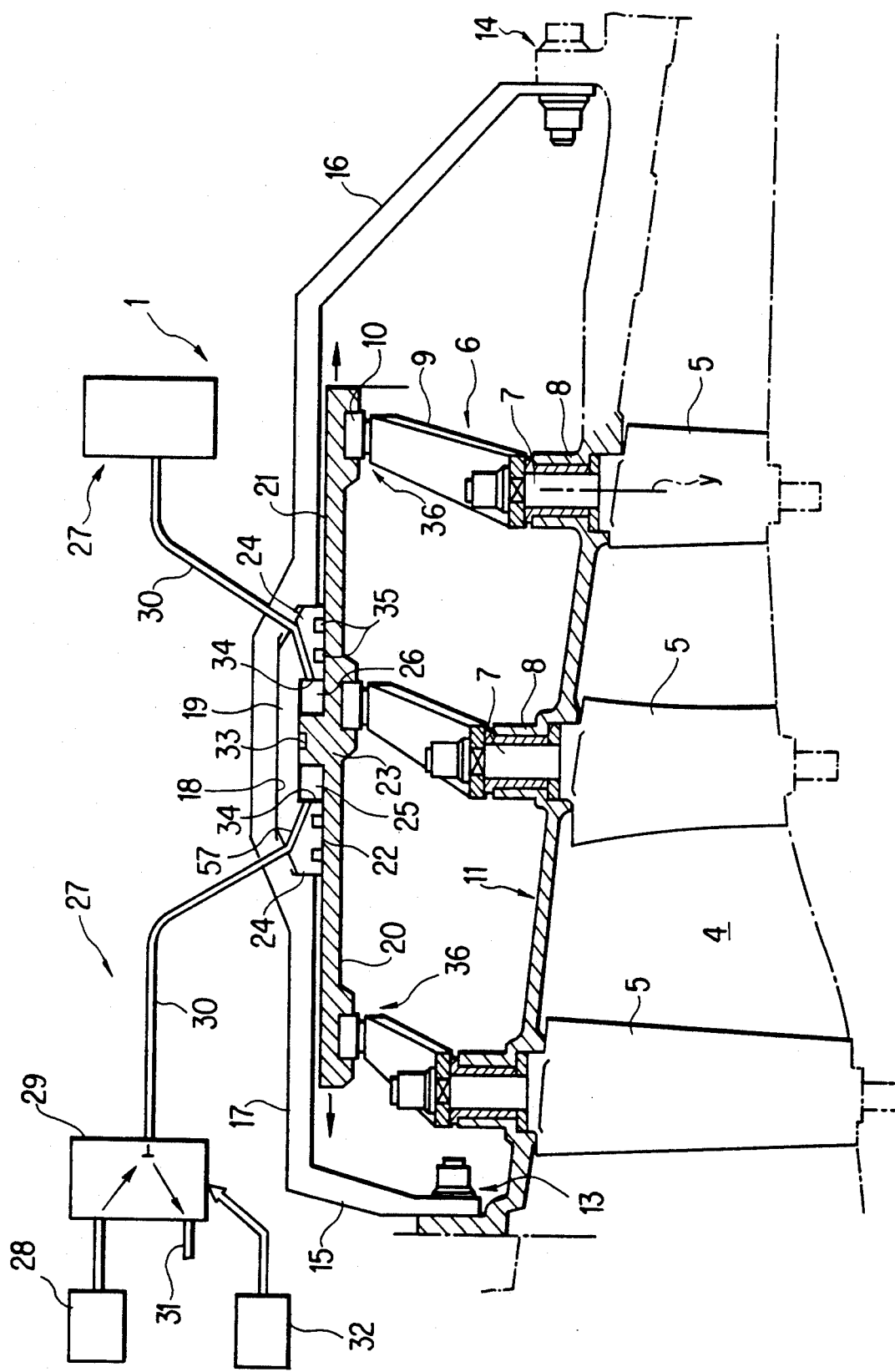
FIG. 2 is an enlarged view of part of FIG. 1 showing a first embodiment of the invention.
Figure 3:
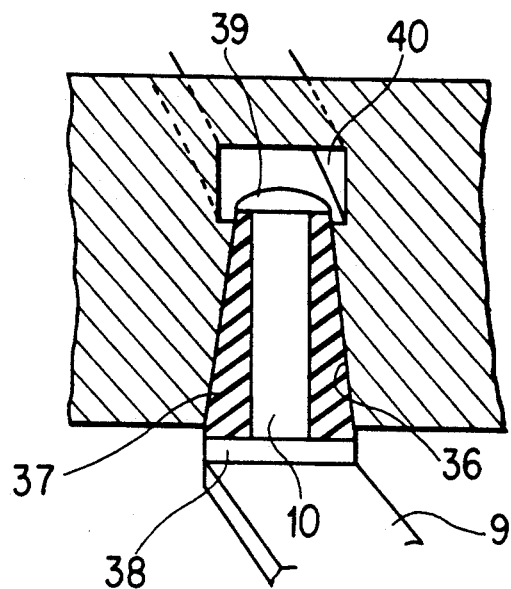
FIG. 3 is an enlarged sectional view of a detail of FIG. 2.
Figure 4:
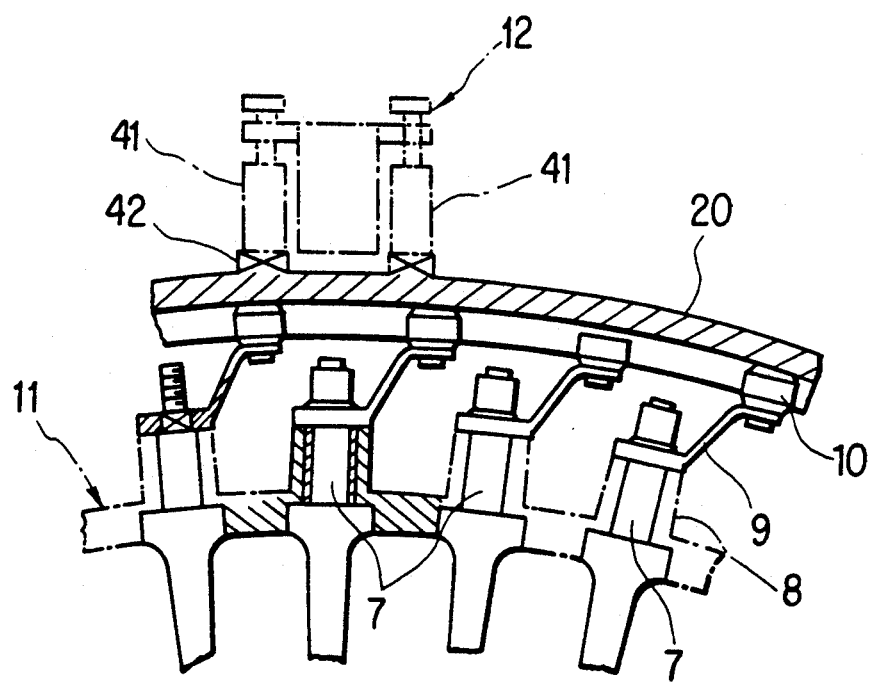
FIG. 4 is a partial radial sectional view of the first embodiment.

Turning now to FIGS. 2,3 and 4 which illustrate the construction of a first embodiment of the invention, it will be seen that the stator 1 comprises a shell 11 in the form of a continuous envelope of revolution which defines the outer wall of the annular flow path 4 and carries the bearings 8, and four longitudinally extending bridges or arches 12 bolted at their ends 13 and 14 to the shell 11, the arches being located outwards of the shell and evenly spaced apart around the shell. The arches 12, only one of which is shown, are each formed essentially by two end struts 15 and 16 which extend radially outwards from the ends 13 and 14, and a central portion 17 which interconnects the end struts and lies a certain distance outwards of the handles 10. The central portion 17 has a central bulge which defines an inwardly-directed reces 18.

The stator 1 further includes a first ring 19 which is received and fixed in the recesses 18, such as by being bolted to the central portions 17 or by wedges which eliminate play within the recesses 18. As the arches 12 are evenly spaced around the circumference of the stator 1 they ensure perfect support for the first ring 19. Finally, the stator 1 also comprises a second ring 20 which is concentric with the first ring 19 and is movable relative thereto in the longitudinal direction. It has a plane external face 21 which slides on two inner slide bearing surfaces 22 of the first ring 19. A circumferential rib 23 projects radially from the plane outer face 21 and is slidably received in a circumferentially extending groove in the first ring 19 delimited at axially opposite ends by annular flat faces 34 defined by two circumferential flanges 24 of the first ring 19. The internal slide bearing surfaces 22 constitute the radial inner limit of the circumferential flanges 24. The volume of the groove is divided by the circumferential rib 23 into two chambers 25 and 26, the volumes of which vary depending on the longitudinal movement of the second ring 20.

This movement of the second ring 20 is controlled by two pressurizing devices 27 which are associated one with each of the chambers 25 and 26. Only one of these pressurizing devices 27 is shown complete since they are in fact identical. Each device 27 comprises a source of pressurized gas 28, a proportioning valve 29 and a duct 30 communicating, via a passage 57 provided in the circumferential flange 24, with the respective chamber 25 or 26 so that the chamber is connected to the source of gas 28 or to an exhaust nozzle 31. The proportioning valve 29 is actuated in accordance with the operating state of the rotor 2, and permits the supply of pressurized gas into the chamber 25 or 26 or, alternatively, the discharge of gas from the chamber.

The two proportioning valves 29 are operated independently by a single electronic control device 32, and it is therefore possible to vary as desired the pressures in the chambers 25 and 26, and hence to move the second ring 20 (as a result of the pressures acting on the circumferential rib 23) until the pressures have equalized. The regulation of the amount of gas filling each chamber 25 and 26 is effected by the duration or the extent of the opening of the proportioning valves 29. The electronic control device 32 may be assisted by pressure gauges which measure the pressure in the chambers 25 and 26 or in the ducts 30, as well as by a motion sensor which measures the position of the second ring 20 at any instant. Such means are well known and are not illustrated.

It is, of course, necessary that the chambers 25 and 26 should be sealed, and this is achieved by a circumferential packing seal 33 carried by the rib 23 and rubbing against the bottom of the groove in the first ring 19, and by further circumferential packing seals 35 disposed in the inner slide bearing surfaces 22 on opposite sides of the groove and rubbing against the plane face 21 of the ring 20. The chambers 25 and 26 are therefore formed almost entirely between the circumferential rib 31 and the flat end faces 34 of the groove in which the rib slides.

The second ring 20 is provided on its radially inner side with three circumferential grooves or channels 36 each of which receives the handles 10 of a respective stage of pivotable blades 5. The embodiment illustrated comprises three stages of pivotable blades 5, but this number may vary, and the stator 1 may have any number of stages of fixed blades without the principle of the invention being affected. As shown in FIG. 3, it is advantageous that the handles 10 are mounted within elastomeric shoes 37 which are firmly pressed into the grooves 36, as any errors in adjustment resulting in particular from errors in alignment of the bearings 8 and differences in thermal expansion will then be absorbed by the shoes 37 without the creation of high stresses. The rotational movements of the handles 10 caused by the axial displacements of the second ring 20 will not damage the shoes 37 as the movements are small in practice. The grooves 36 have a trapezoidal section narrowing towards the bottom, and the section of shoes 37 is correspondingly shaped so that the positioning and clamping of the shoes is made easy. The handles 10 are provided with two collars 38 and 39 between which the shoes 37 are held, and the grooves 36 widen at the bottom to define a recess 40 large enough for the inner collars 39 not to come into engagement with the grooves 36. The shoes 37 also prevent the free rotation of the second ring 20 around the axis X.

The inner slide bearing surfaces 22 and the plane outer face 21 are separated by a small clearance and, as may be seen from FIG. 4, the centering of the two rings is effected by roller shoes 41 which are situated longitudinally on opposite sides of the recess 18 of each arch 12 and which bear upon the plane outer face 21 through needle rollers 42. The roller shoes 41 may be secured to the arches 12 by a conventional spring suspension permitting adjustment of their radial position and the force exerted thereby.

Figure 5:
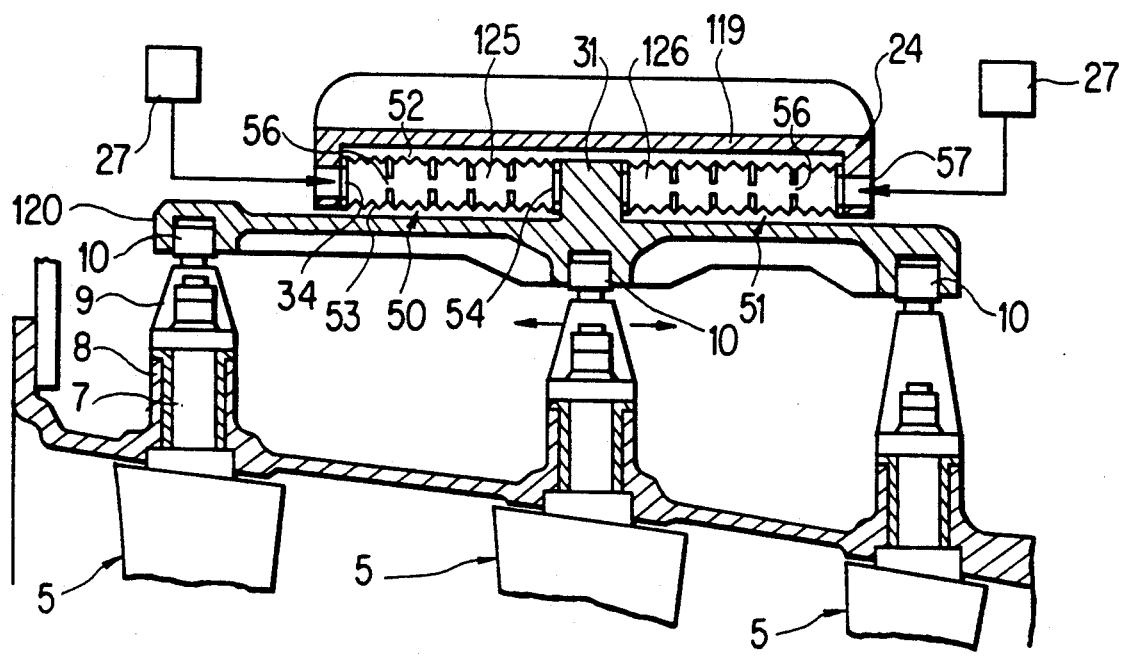
FIG. 5 is a view similar to FIG. 2 but illustrating a second embodiment.
Figure 6:
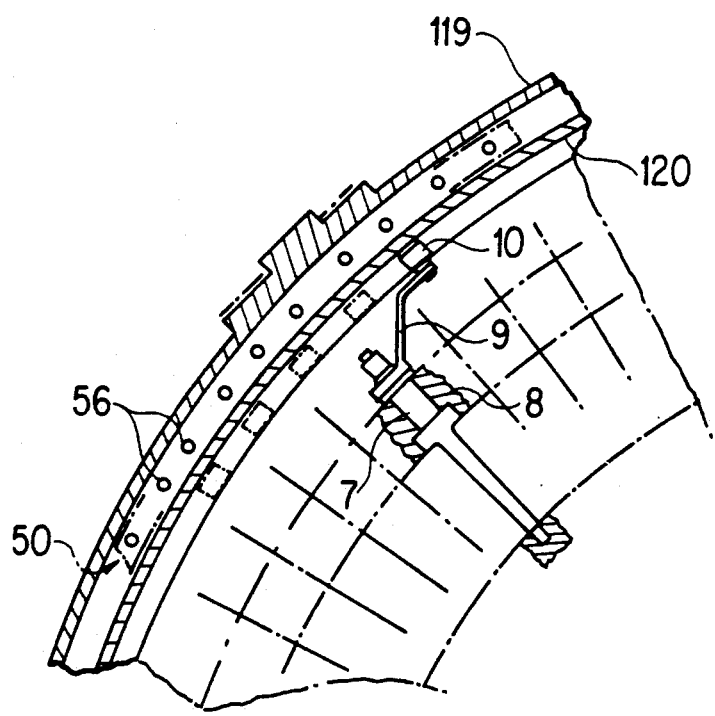
FIG. 6 is a partial radial sectional view of the second embodiment.

The second embodiment illustrated in FIGS. 5 and 6 is similar to that of FIGS. 2 and 4, and only those elements which are particular to it will be described, elements which are similar or identical with those of the first embodiment being given the same references.

In the second embodiment no sealing is effected directly between the first ring, designated by reference 119, and the second ring, designated by reference 120. The sealed chambers 125 and 126 are defined essentially by annular bellows 50 and 51, each formed by concentric outer and inner envelopes 52 and 53. An annular end plate 54 connects the envelopes 52 and 53 of each bellows 50,51 at one end and bears on a respective side face of the circumferential rib 31. Annular spacers 55 provided with holes 56 are arranged within the bellows 50 and 51 to stiffen them and to maintain the spacing and parallelism of the envelopes 53 and 53. The supply of gas to the bellows 50,51 is effected through ports 57 which pass through the circumferential flanges 24 of the first ring 119 and open into the bellows 50 and 51 at their ends opposite the plates 54. Sufficient ports 57 are provided to ensure rapid uniformity of the pressures in the chambers 125 and 126, and the ducts of the pressurizing devices 17 are divided accordingly. The ends of the envelopes 52 and 53 opposite the end plates 54 are welded around their entire perimeter to the flat faces 34 of the circumferential flanges 24.

Figure 7:
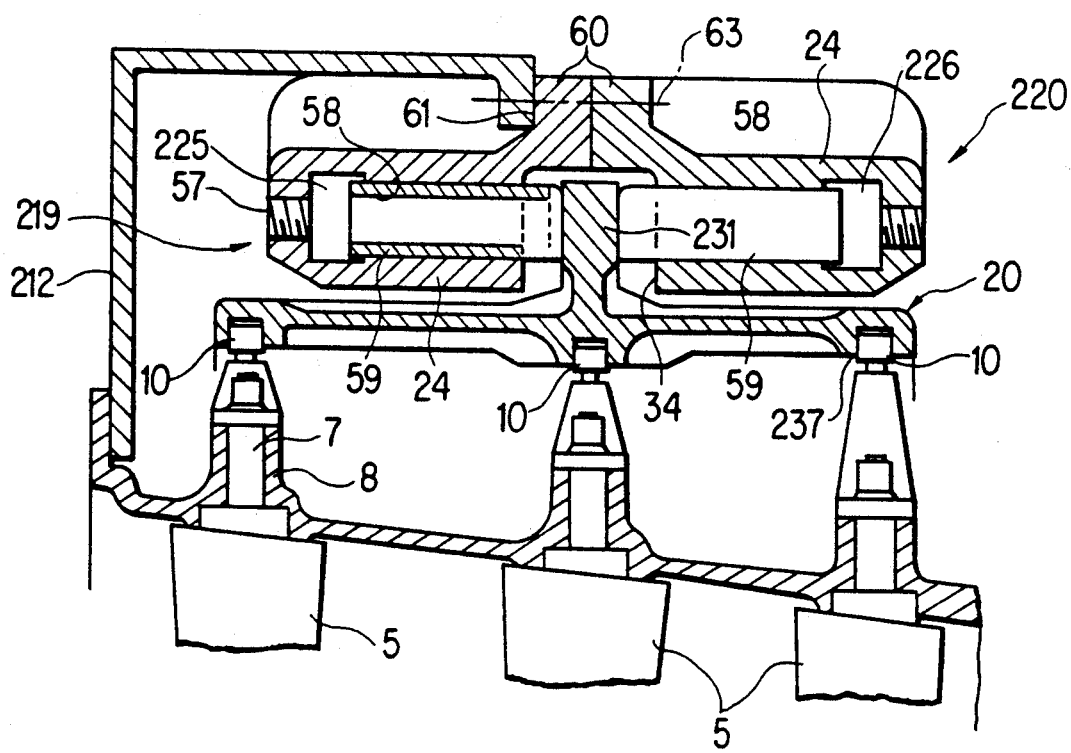
FIG. 7 is a view similar to FIGS. 2 and 5, but illustrating a third embodiment.
Figure 8:
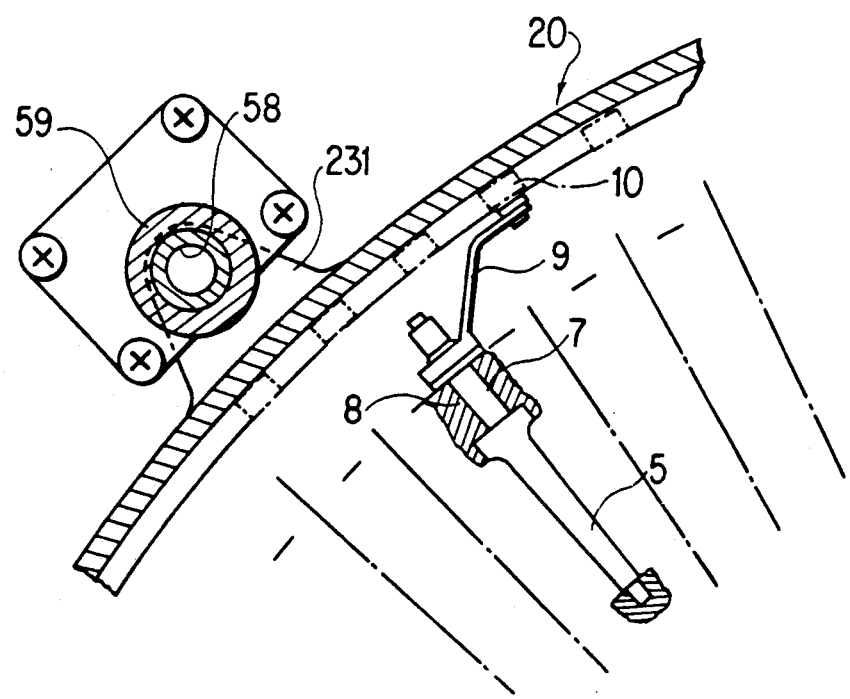
FIG. 8 is a partial radial sectional view of the third embodiment.

In the third embodiment shown in FIGS. 7 and 8, the sealed chambers 225 and 226 are enclosed within the first ring 219 and more precisely in its circumferential flanges 24. They open towards the circumferential rib 231 of the second ring 220 through cylindrical passages 58 formed in the flanges 24 and in which pistons 59 are slidably fitted. The heads of the pistons 59 bear on the circumferential rib 231, as do the end plates 54 of the bellows in the second embodiment, and transmit to it the forces exerted on the pistons by the pressures of the gas supplied to the chambers 225 and 226 through ports 57 in the flanges 24.

The pistons 59 are hollow in order to reduce their weight, and it is also worthy of note that the first ring 219 is formed in this embodiment in the form of a discontinuous annular structure composed of eight similar sections 60, each having a chamber 225 or 226, a supply port 57, a piston 59 and a collar 61. The sections 60 are assembled symmetrically in pairs by bolts 62 through their juxtaposed collars 61, and each assembled pair of sections 60 is attached to a respective one of the arches 212 by further bolts 63. The circumferential rib 231 is also discontinuous, being composed of four segments which are located between the pistons 59 of the section pairs attached to the arches 212. The chambers 225 or 226 situated on the same side of the rib 231 as each other are of course all connected to a common pressurizing means, so that it may be considered that there is only one chamber on each side of the rib even though it is divided into a number of parts.

It will also be observed that the shoes 237 for securing the handles 10 in the circumferential grooves 36 of the second ring 20 have a rectangular section, which affords the same advantages as the trapezoidal section shoes of the first embodiment with the exception of ease of insertion into the grooves 36.

The embodiments which have been described are not limiting, and other embodiments may be devised, for example by combining or regrouping differently some of the constituent elements. Thus, the unitary or divided arrangement of the chambers is not necessarily associated with the embodiments which have been described. It should also be appreciated that it is possible to use a pressurised chamber on one side only of the rib carried by the second ring, the pressure being balanced by a device such as an assembly of springs acting on the ring in the opposite direction. However, this arrangement suffers from the drawback of not altogether avoiding the risk of unsatisfactory circumferential distribution of the forces which is inherent in the already known systems and which can cause a jam or at least impede satisfactory operation.

The invention is applicable to various types of turbomachines, and particularly to aircraft engine turbo-compressors where the first stages of blades at the stator inlet are of the pivotable type.

We claim:

1. A turbomachine comprising a first annular structure disposed about a longitudinal axis, at least one circumferential stage of pivotable blades carried by said first annular structure, each blade of said at least one stage being mounted to pivot about a radial axis, a plurality of operating levers connected to said blades, a second annular structure disposed about said longitudinal axis and engaging said operating levers whereby relative displacement of said first and second annular structures in the direction of said longitudinal axis causes said operating levers to pivot said blades, means for maintaining said first and second annular structures disposed concentrically with respect to each other, at least one circumferentially directed flange on one of said first and second annular structures defining a circumferentially directed groove in said one annular structure, a circumferentially directed rib on the other of said first and second annular structures disposed in said groove and dividing said groove into two portions of variable volume, means cooperating with said rib and said at least one flange to define a sealed chamber in at least one of said two portions of said groove, and control means for adjusting the quantity of gas in said sealed chamber or chambers to cause controlled relative displacement of said first and second annular structures in the direction of said longitudinal axis.

2. A turbomachine according to claim 1, wherein said operating levers are each provided with a radial handle, and said second annular structure is provided with at least one circumferential channel in which said handles of said operating levers are received to effect said engagement between said second annular structure and said operating levers.

3. A turbomachine according to claim 1, wherein a sealed chamber is defined in each of said two portions of said groove, and said control means includes an independent control device for each of said two sealed chambers.

4. A turbomachine according to claim 1, wherein said sealed chamber or chambers are continuous around the entire circumference of said groove.

5. A turbomachine according to claim 1, wherein said means cooperating with said rib and said at least one flange to define said sealed chamber or chambers comprises a seal mounted on said at least one flange to rub against said other annular structure, and a seal mounted on said rib to rub against said one annular structure.

6. A turbomachine according to claim 1, wherein said means cooperating with said rib and said at least one flange to define said sealed chamber of chambers comprises bellows extending between said at least one flange and said rib.

7. A turbomachine according to claim 6, wherein said bellows is an annular bellows which is continuous around said groove.

8. A turbomachine according to claim 7, wherein said bellows contains perforated circumferential stiffening walls.

9. A turbomachine according to claim 1, wherein said means cooperating with said rib and said at least one flange to define said sealed chamber or chambers comprises pistons sealingly slidable in said at least one flange and pressing against said rib, said chamber or chambers being enclosed in said at least one flange.

* * * * *